May 15, 1951 S. M. STAUCH 2,553,484
GRAIN COMBINE STRAW HARVESTER
Filed March 30, 1949 3 Sheets-Sheet 3
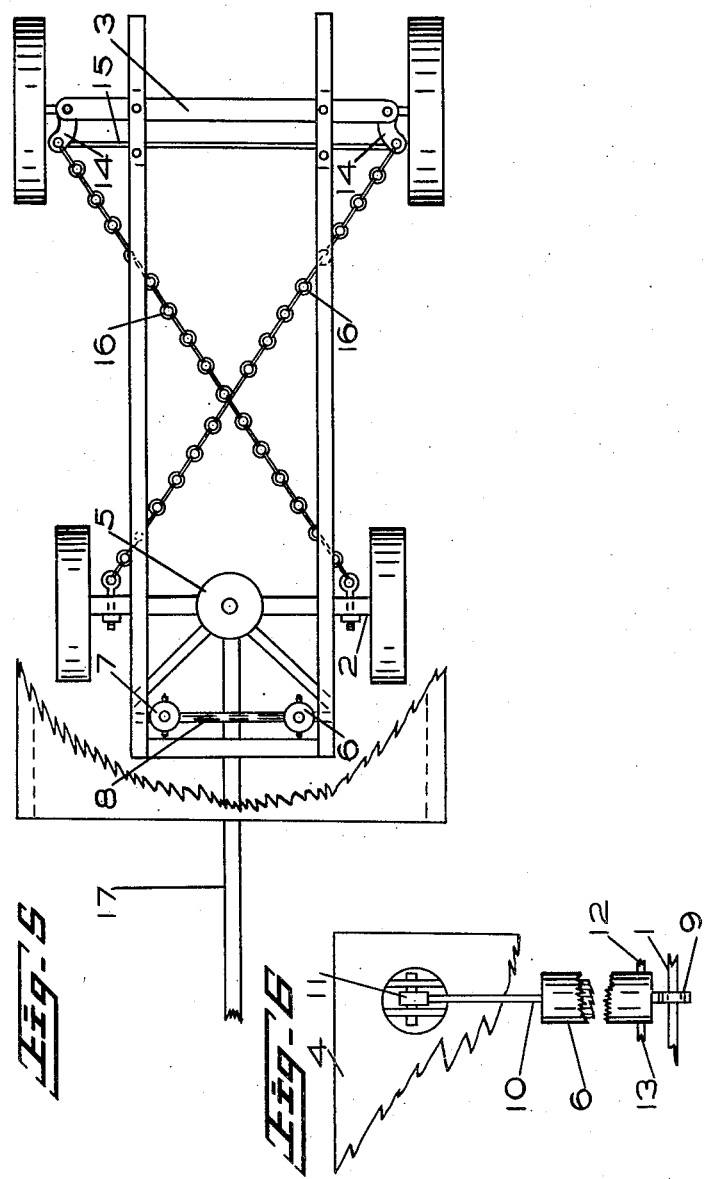

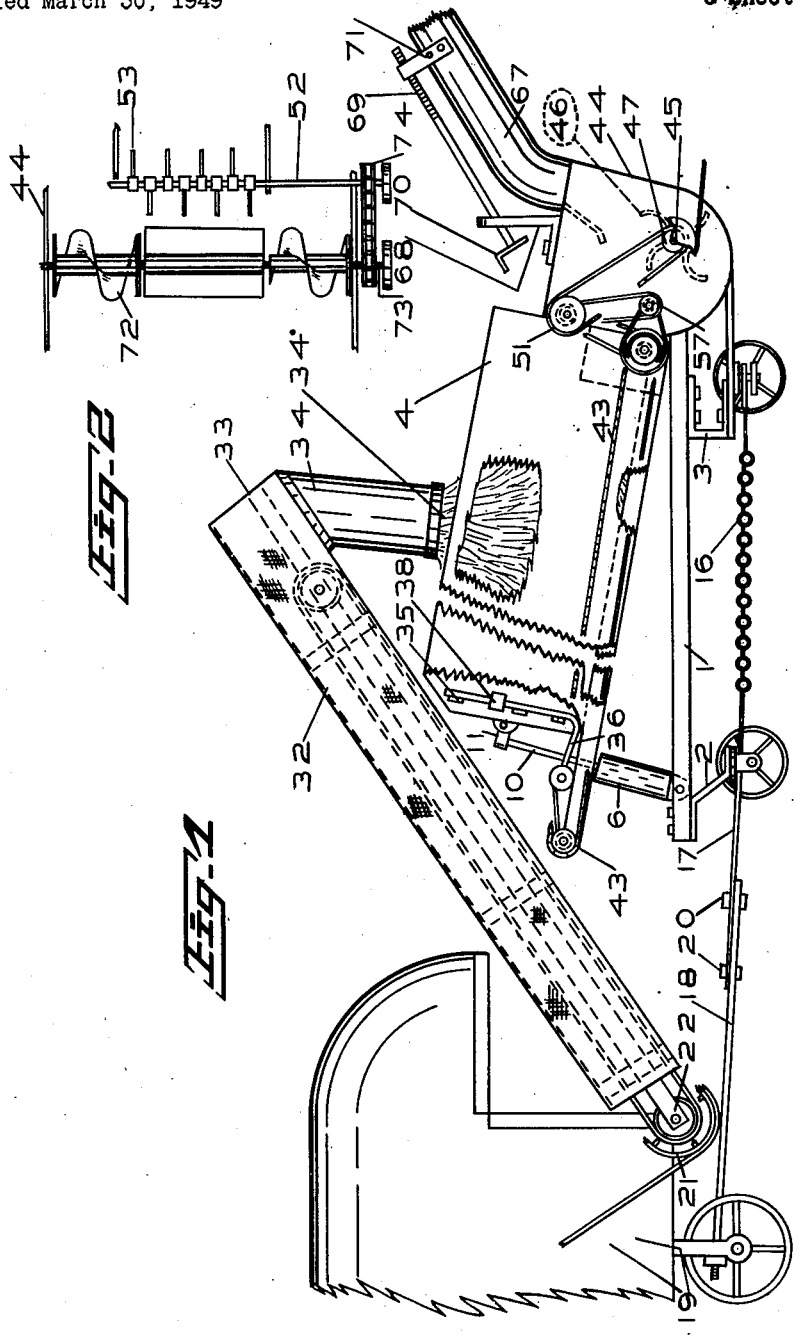

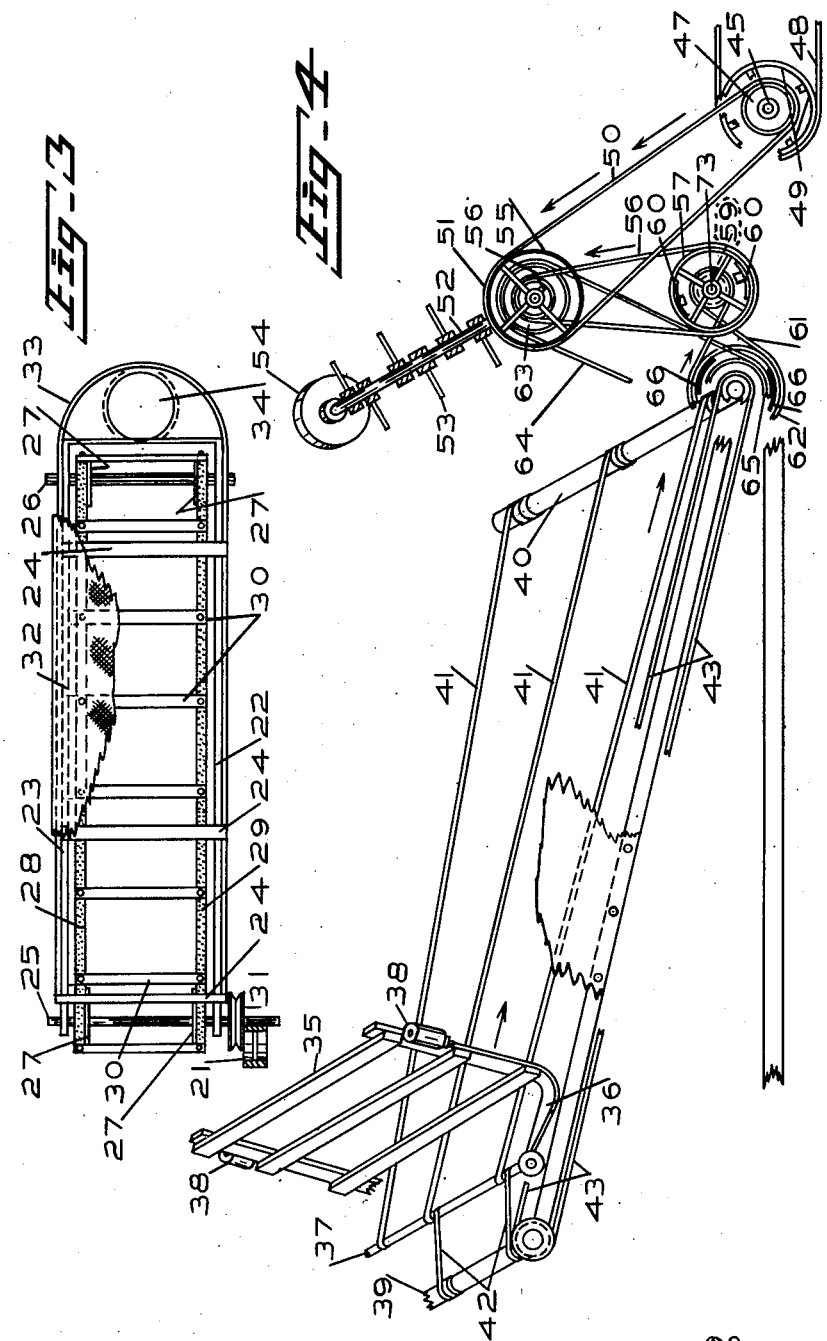

Patented May 15, 1951

2,553,484

UNITED STATES PATENT OFFICE 2,553,484

GRAIN COMBINE STRAW HARVESTER

Stanley Mike Stauch, Yarbo, Saskatchewan, Canada

Application March 30, 1949, Serial No. 84,290
In Canada September 4, 1948

3 Claims. (Cl. 214—83.28)

My invention relates to straw carriers for combine harvesters, more particularly having reference to a following attachment by which the chaff and straw from the combine may be accumulated and subsequently discharged where required for use.

In the art to which the invention relates the disposal of straw from the combine is unsatisfactory, in that considerable extra work is required in accumulating and disposing of the straw with the added disadvantage that weed seeds from the combine are scattered in the fields.

The present invention contemplates provision of an economical and convenient means of accumulating and disposing of the straw from the harvester. One of the objects of the invention is accordingly to provide a following attachment for combine harvesters by which the straw and chaff discharged from the harvester may be accumulated for subsequent disposal.

A further object of the invention is to provide means adapted to be driven from the combine for conveying the straw to a following carrier.

A still further object of the invention is to provide an attachment for discharging the straw from the carrier, including means for moving the straw in the carrier to the discharging attachment, and means for tilting the carrier to facilitate such discharge.

Other features and advantages of the invention will become apparent by reference to the accompanying description taken in conjunction with the drawings wherein like characters of reference indicate like parts throughout the several views and wherein:

Fig. 1 is a side view of a straw carrier in accordance with my invention, shown in attachment to a combine and partly broken away.

Fig. 2 is a detail top view of a straw guide.

Fig. 3 shows a top plan view of the carrier.

Fig. 4 is a diagrammatic view showing the back for effecting movement of straw in the carrier and the mechanism for operation of the back, and including the driving connections for the back and the straw discharging apparatus, and further including the mechanical fork for moving the straw into the fan casing for discharge from the carrier.

Fig. 5 is a plan view of the truck with fragment of the carrier body.

Fig. 6 shows a detail side view, broken away, of the hydraulic lift and connections to the truck and carrier body.

Having reference to the drawings, I indicates generally the truck frame which is forwardly and rearwardly supported on wheel trucks 2 and 3, and is adapted to carry a body 4 for the straw, said body being rearwardly hinged in any convenient manner to the frame I to tilt, as in Figure 1, for dumping purposes. The wheel truck 2 would include a turntable 5 on which the front axle turns, and hydraulic lifts at 6 and 7 for tilting the body 4, these lifts being supported on the frame I pivoted on a rod 8 by means of lugs, as at 9, on the lower ends of the lifts, and having piston rods 10 pivotally connected, as at 11, to the carrier body 4. The lifts include connections 12 and 13 for reception and discharge of fluid under pressure.

The above is merely a suggested arrangement and for which any hydraulic lifts could be used.

Steering connections for the carrier are shown in Figure 5, these being of a character in common use and including steering arms 14—14 with tie rod 15, and chains 16—16 from the steering arms to the front truck.

A tongue or draft connection 17 is provided for the carrier by which it may be connected by a draft bar 18 to the combine, indicated generally by the numeral 19, the connection being made lengthwise adjustable at 20.

For conveying straw and chaff from the combine I provide a conveyer rearwardly carried on the carrier and supported at its receiving end by the combine and including a pulley 21 for a driving connection. The conveyer includes a frame comprising side bars 22 and 23 with connecting cross bars 24 at intervals. Mounted for rotation in the frame side bars 22 and 23 are shafts 25 and 26 with pulleys 27 fixed thereto and on which are trained belts 28 and 29 with connecting slats 30. The shaft 25 includes a V pulley wheel 31 additional to the pulley 21.

The conveyer is enclosed throughout its length by a casing 32, but is open at the lower end to receive straw discharging from the combine, and at the upper end provides an outlet attachment 33 with depending canvas pipe 34 for discharge of straw and chaff from the conveyer, the pipe 34 including a metal ring 34' at the lower end to maintain its shape.

The carrier body 4 is open at its upper side to receive straw discharging from the pipe 34, and provides an outlet at the rear end discharging into a fan casing 44.

For moving the straw and chaff from the carrier I provide a back 35 movable in the body 4, the back including supporting portions 36 connected by a rod 37, and may include rollers, as at 38, for sliding along the walls of the carrier body.

Within the carrier body are mounted rollers 39 and 40, one at each end, these being mounted in suitable bearings in the carrier walls. To the one roller 40 are fixed three cables 41 that attach to the rod 37 on the back 35 and are adapted, when the cables are wound on the roller, to pull the back 35 towards the outlet from the carrier body for discharge of the straw and chaff. The roller 39 likewise has three cables 42 fixed thereto and to the rod 37, and these are wound on the roller 39 when the back 35 is at the rear of the carrier body, to be unwound by forward movement of the back 35 and be used to withdraw said back.

For this I employ a cable 43 between the rollers 39 and 40 of a length to be wound on one or other of said rollers similarly to the cables 41 and 42, so that movement of the roller 40 in one direction winds the cable 43 on the roller 39, as when the back 35 is moved to discharge the straw and chaff, and to reverse the roller 39 when the roller 40 is reversed in moving the back 35 rearward.

The fan casing 44 includes a fan shaft 45 with blades 46, the shaft being driven by a pulley 49 and belt 48 connectable to a source of power, such as a tractor used to haul the carrier to the place of discharge.

On the shaft 45 is a further pulley 47 connecting by a belt 50 to a pulley 51 on a shaft 52 mounted rotatable in the fan casing 44 and carrying a series of teeth 53 adapted to engage the straw from the carrier and fork it into the fan casing. The shaft 45 includes a balance wheel 54.

The shaft 52 connects by a pulley 55 and belt 56 to drive a pulley 57 on a shaft 73 mounted in the fan casing. On the shaft 73 is a pulley 59 with a clutch 60 to be connected to be driven by the shaft 73. The pulley 59 connects by a belt 61 in driving relation to a pulley 62 on the roller 40 by which the roller may be rotated to move the back 35. There is further provided a pulley 63 on the shaft 52 connecting by a belt 64 to a pulley 65 loose on the roller 40 and connectable by a clutch 66 for reversing the roller to move the back 35 backward.

The fan casing 44 includes a blower outlet pipe 67 with an adjustable support comprising a bracket 68 on the fan casing 44, a rod 69 free to turn in the bracket by a handle 70, the rod threadably engaging a bracket 71 on the outlet pipe 67.

To aid in discharge of straw and chaff from the carrier there may be included a worm 72 (Figure 2) mounted transversely in the fan casing on the shaft 73 in opposing relation to the carrier outlet and the fork 53, the worm being driven by a chain 74 forming an operating connection by means of sprocket wheels on the shafts 52 and 73.

In the operation of the device, straw and chaff from the combine discharges by the conveyer and pipe 19 to the carrier body 4 until a load is complete, when the carrier is taken to the place for its disposal. For discharging from the conveyer the pulley 47 is connected to a source of power to drive the fan shaft 45 and the fork shaft 52 to move the straw and chaff out the pipe 67.

By connecting the clutch 60 the back 35 may be moved in the carrier to shift the straw and chaff to the outlet, and when the carrier is empty the clutch 66 is connected to restore the back 35 to its position to receive a new load.

While I have herein disclosed a preferred embodiment of my invention, it is obvious that changes in the construction and arrangement of parts would be permissible, and in so far as such changes come within the spirit and scope of the invention as defined in the appended claims they would be considered a part hereof.

Having thus particularly described and ascertained the nature of my invention, what I claim and wish to secure by Letters Patent is:

1. A following straw carrier for combine harvesters comprising a wheel supported frame adapted for attachment in following relation to a combine harvester, a carrier body mounted to tilt on the frame, means for tilting the carrier body, a conveyer on the carrier body adapted for receiving straw from the combine harvester and discharging the straw into the carrier body, said conveyer being adapted to be driven from a source of power in the combine harvester, a fan casing on the carrier body, said body having an outlet discharging into said casing, a fan in the casing, means connectable to an outside source of power for driving the fan, a pipe discharging from the fan casing, and means in the carrier body for effecting movement of straw therein to the outlet therefrom, said means including a rack mounted to be moved lengthwise of the carrier in either direction and means connectable to the fan driving means for moving the rack.

2. A device as defined in claim 1 and including a shaft mounted transversely of the carrier outlet, forks on the shaft adapted when the shaft is rotated to engage and move straw from the carrier body to the fan casing, and means for driving said shaft from the fan driving means.

3. A following straw carrier for combine harvesters including a wheel supported frame, means for attaching the frame in following relation to said harvester, a carrier body on the frame mounted to tilt rearwardly, means for tilting the body, a conveyer on the body adapted to receive straw from the combine harvester and discharge the straw into the carrier body and including means for connection to a source of power in said harvester for driving the conveyer, and means for discharge of the straw from the carrier body, said means including a fan casing, the carrier body including an outlet discharging into said casing, a fan in the casing, means for connection to an outside source of power for driving the fan, a pipe providing a discharge outlet for straw moved by the fan, a shaft on the carrier body mounted transversely of the outlet therefrom, forks on the shaft adapted for engaging the straw when the shaft is rotated to move the straw into the fan casing, and means for driving the shaft from the fan driving means.

STANLEY MIKE STAUCH.

REFERENCES CITED

The following references are of record in the file of this patent:

UNITED STATES PATENTS

| Number | Name | Date |
|---|---|---|
| 1,226,588 | Perry | May 15, 1917 |
| 2,182,592 | Lefferdink et al. | Dec. 5, 1939 |
| 2,213,906 | Ebersol | Sept. 3, 1940 |
| 2,463,987 | Malone et al. | Mar. 8, 1949 |
| 2,477,707 | Walz | Aug. 2, 1949 |
| 2,477,794 | Gehl | Aug. 2, 1949 |
| 2,496,472 | Huddle | Feb. 7, 1950 |